United States Patent [19]

Habiger

[11] 4,106,292
[45] Aug. 15, 1978

[54] SPEED AND LOAD RESPONSIVE UNDERSPEED ACTUATOR FOR HYDROSTATIC TRANSMISSIONS

[75] Inventor: Cyril W. Habiger, Joliet, Ill.

[73] Assignee: Caterpillar Tractor Co., Peoria, Ill.

[21] Appl. No.: 807,278

[22] Filed: Jun. 16, 1977

[51] Int. Cl.² ............................................. F16H 39/46
[52] U.S. Cl. ......................................... 60/447; 60/449
[58] Field of Search ................. 60/447, 449, 488, 494

[56] References Cited

U.S. PATENT DOCUMENTS

| | | | |
|---|---|---|---|
| 3,054,263 | 9/1962 | Budzich et al. | 60/447 |
| 3,952,514 | 4/1976 | Habiger | 60/447 X |
| 3,952,515 | 4/1976 | Habiger et al. | 60/447 |

*Primary Examiner*—Edgar W. Geoghegan
*Attorney, Agent, or Firm*—John W. Grant

[57] ABSTRACT

An underspeed actuator has a piston connected to a control means of a first pump driven by a prime mover and is movable between a first position at which the first pump is at minimum displacement and a second position at which the first pump is at maximum displacement. The underspeed actuator has first and second actuating chambers at opposite ends of the piston and a biasing device urging the piston towards the first position. The piston is movable between the first and second positions in response to pressure differential in said first and second chambers. A signal device controllably develops first and second control signals in response to the operating speed of the prime mover and delivers said first and second signals to respective first and second chambers. A first device controllably reduces the magnitude of fluid pressure in the first chamber in response to the rate of pressure rise of the output fluid of said first pump exceeding a preselected rate of pressure rise.

9 Claims, 2 Drawing Figures

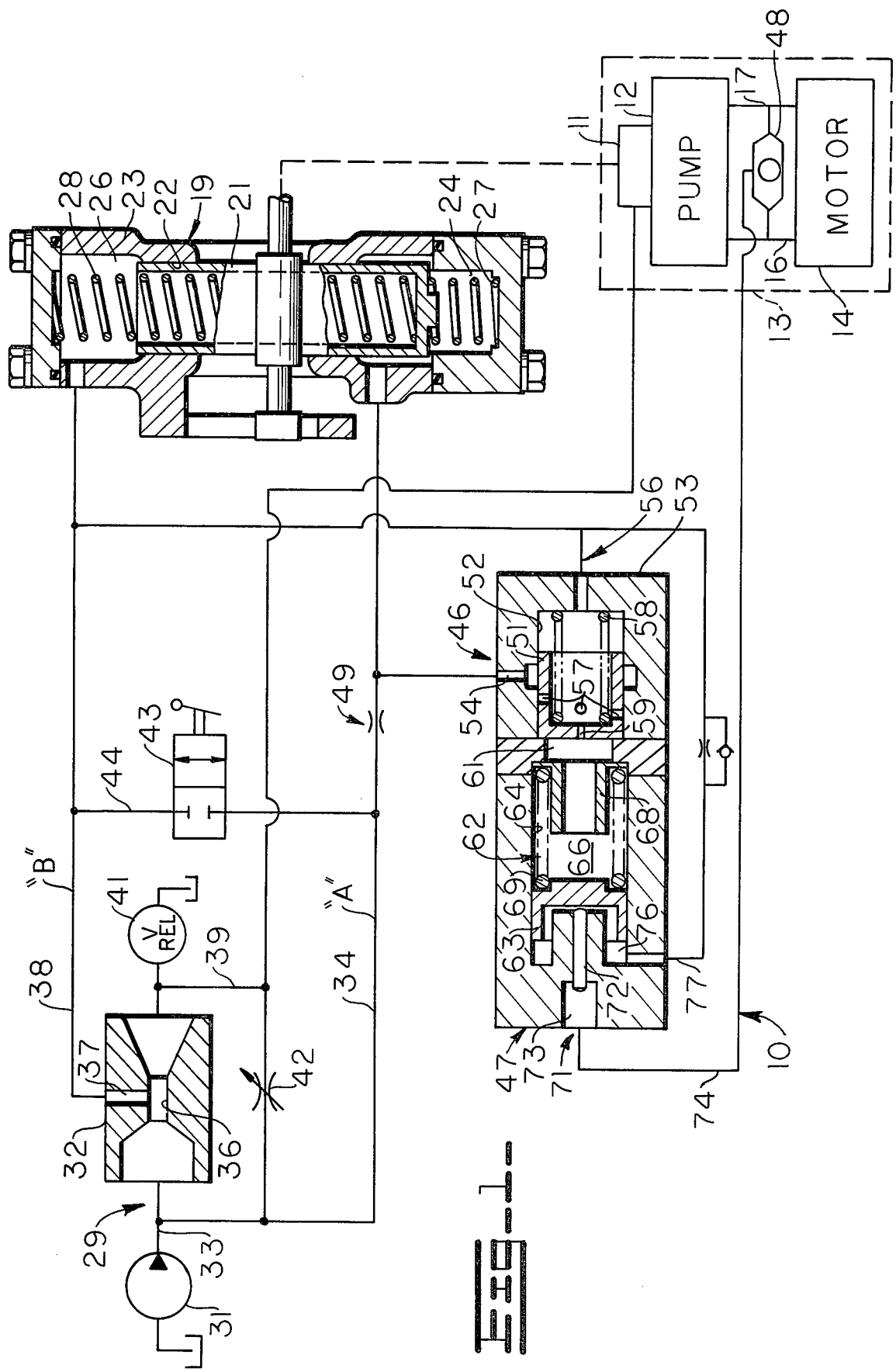

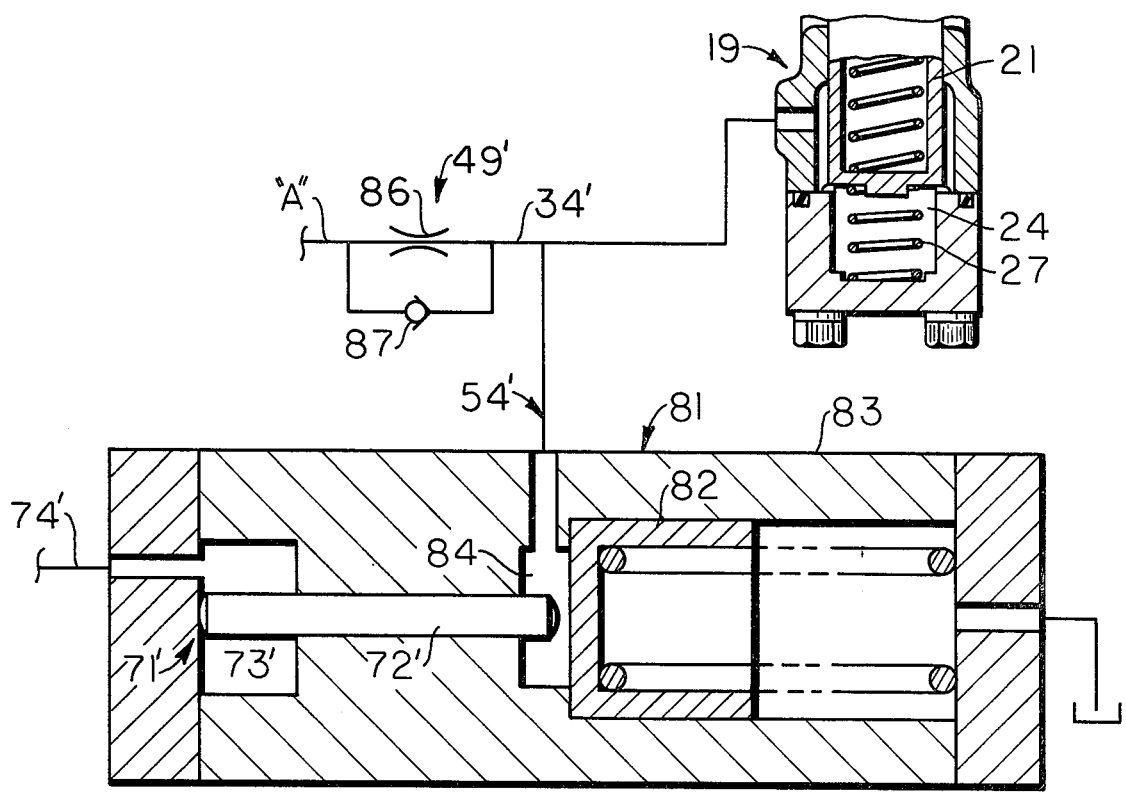
Fig_2_

SPEED AND LOAD RESPONSIVE UNDERSPEED ACTUATOR FOR HYDROSTATIC TRANSMISSIONS

BACKGROUND OF THE INVENTION

Many vehicles having hydrostatic transmissions also are provided with an underspeed actuator which functions to reduce the load on the engine by reducing the displacement of the pump of the hydrostatic transmission when the speed of the engine falls below a preselected speed range in response to an external load such as when the vehicle is operated up hill or otherwise encounters an increased load. One of the problems encountered with such underspeed actuators is that of providing rapid response thereof when a load is suddenly imposed on the hydrostatic transmission causing a sudden increase in the pump output pressure. It is desirable to commence adjusting the pump displacement immediately under such condition to enable the engine to maintain a higher operating speed thereby improving performance and efficiency.

SUMMARY OF THE INVENTION

The present invention is directed to overcoming one or more of the problems as set forth above.

According to the present invention a control system for controlling the displacement of a first pump driven by a prime mover has a control means for controlling the displacement of said first pump. An underspeed actuator has a piston, first and second actuating chambers at opposite ends of said piston and a biasing means. The piston is connected to the control means and movable between a first position at which said first pump is at minimum displacement and a second position at which said first pump is at maximum displacement. The biasing means urges the piston toward the first position. The piston is movable between the first and second positions in response to pressure differential in said first and second chambers. A signal means controllably develops first and second control signals in response to the operating speed of the prime mover and delivers said first and second signals to respective first and second chambers. A first means controllably reduces the magnitude of fluid pressure in the first chamber in response to the rate of pressure rise of the output fluid of said first pump exceeding a preselected rate of pressure rise.

BRIEF DESCRIPTION OF THE DRAWINGS

FIG. 1 is a diagrammatic view of the apparatus of this invention with portions shown in section for illustrative convenience; and FIG. 2 is a sectional view of an alternate embodiment of the apparatus of this invention.

DETAILED DESCRIPTION

Referring now to FIG. 1 of the drawings, a control system is generally indicated by the reference numeral 10 and is connected to a control means 11 which controls the displacement of a variable displacement pump 12. The pump 12 is a component of a hydrostatic transmission 13 and is driven by an engine or prime mover, not shown. A drive motor 14 is connected to the pump through a closed hydraulic loop having first and second conduits 16 and 17.

An underspeed actuator 19 is mechanically connected to the control means 11 and includes a piston 21 slidably positioned within a bore 22 of a body 23. First and second fluid actuating chambers 24, 26 are positioned at opposite ends of the piston 21. First and second springs 27, 28 are positioned within the first and second chambers preferably at opposite ends of the piston with preferably the second spring being sized sufficient to bias the piston to the position shown in the absence of fluid pressure in either of the chambers, when the fluid pressure in the chambers is equal, or when a pressure differential existing in the chambers is such that the combined force of the second spring 28 and force generated by the pressurized fluid in the second chamber 26 is greater than the force generated by the pressurized fluid in the first chamber 24 and the first spring 27.

For an understanding of the operation of the underspeed actuator 19 and its connection to the control means 11 of the pump 12, it will suffice to state that the piston 21 is movable between a first position at which the displacement of the pump 12 is adjusted to its minimum displacement and a second position at which the displacement of the pump is adjusted to its maximum displacement. As shown in the drawings, the piston 21 is at its first position. The piston 21 is moved between the first and second positions in response to pressure differential existing between the first and second chambers 24, 26 as well as the force of the spring 28. The first and second positions of the piston 21 are also referred to as "full underspeed" and "zero underspeed," respectively.

A signal means 29 develops first and second control signals "A," "B" at a pressure differential that is substantially proporational to the operating speed of the engine and delivers the first and second control signals to the first and second chambers 24, 26, respectively.

The signal means 29 can be, for example, a control pump 31 and a venturi 32. The control pump is driven by the engine to produce fluid flow proportional to the operating speed of the engine. The venturi 32 is connected to the control pump 31 through a pump output line 33. A first signal conduit 34 is connected to the pump output line and to the first actuating chamber 24 for delivering the first signal "A" to the first chamber. The venturi 32 has a venturi throat 36 connected to the pump output line 33 and a low pressure port 37 positioned adjacent the venturi throat. A second signal conduit 38 connects the low pressure port 37 to the second chamber 26 for delivering the second signal "B" to the second chamber. A conduit 39 connects the venturi to the control means 11 of the pump 12. A relief valve 41 is connected to the conduit 39 and maintains a predetermined pressure within the first signal conduit 34 and the conduit 39.

A venturi bypass valve 42 is positioned in parallel with the venturi throat 36 for adjusting the fluid flow through the venturi throat. The venturi bypass valve is provided to fine-tune the signal means 29 for providing a predetermined pressure drop between the first and second signal conduits 34, 38 at a preselected engine speed. Preferably, the bypass valve is adjusted so that when the engine speed is at high idle, the pressure differential between the first and second signal conduits 34, 38 is such that the higher fluid pressure in the first signal conduit and thus the first actuating chamber 24 is sufficient to overcome the second spring 28, thus shifting the piston 21 upwardly to its second position.

Preferably, a manually actuatable override valve 43 is positioned within a conduit 44 interconnecting the first and second signal conduits 34, 38. Selectively shifting the override valve to the left adjusts the pressure differential in the first and second chambers 24, 26 causing the piston 21 of the underspeed actuator 19 to move toward the first position.

The above described basic elements are all well known in the art.

A first means 46 is connected to the first and second signal conduits 34, 38 for reducing the fluid pressure level of the first control signal "A" in the first chamber 24 for moving the piston 21 of the underspeed actuator 19 toward the first position in response to the rate of pressure rise of the output fluid of pump 12 exceeding a preselected rate of pressure rise.

The first means 46 can be, for example, a pressure sensitive shunt valve assembly 47 connected to the first and second chambers 24, 26 and to a resolver valve 48 interconnected between conduits 16, 17, and a flow control means such as an orifice 49 connected to the first conduit 34.

The valve assembly 47 has a valve member 51 slidably positioned within a bore 52 of a multi-part housing 53. A first passage means 54 connects the bore 52 with the first conduit 34 intermediate the orifice 49 and the first chamber 24. A second passage means 56 connects the bore 52 with the second conduit 38. The valve member is movable between a first position at which first chamber 24 is isolated from second chamber 26 and a second position at which the first chamber is communicated with the second chamber through a plurality of ports 57 in the valve member.

The valve member 51 is resiliently urged to the first position as shown in the drawing by a spring 58 positioned at one end of the valve member. An orifice 59 in the valve member communicates a chamber 61 at the other end of the valve member with the second passage means 56. The orifice is sized so that fluid leaving the chamber 61 below a preselected flow rate passes through the orifice without affecting the position of the valve member. Conversely, when the fluid leaves chamber 61 at a flow rate above the preselected flow rate, the valve member is moved to the right to the second position.

The orifice 49 preferably is sized sufficient for limiting fluid flow therethrough and for causing fluid to be transferred from the first chamber 24 to the second chamber 26 at the second position of the valve member 51.

A means for moving the valve member 51 to the second position can be a linear pump 62 included as part of the pressure sensitive shunt valve assembly 47. The linear pump has a pump piston 63 slidably positioned within a bore 64. A chamber 66 is formed in the bore at one end of the pump piston and communicates with the chamber 61 through a central opening in a spring seat 68. A spring 69 is positioned within the chamber 66 between the spring seat and the piston for urging the pump piston to the left.

A piston means 71 is associated with the pump piston 63 for moving the pump piston within bore 64 and for pumping fluid from the chamber 66 to the chamber 61 in response to the rate of pressure rise of the output fluid of the pump 12 exceeding the preselected rate of pressure rise.

The piston means 71 can be a piston 72 having one end in abutment with the pump piston 63 and its other end positioned within a chamber 73. A line 74 connects chamber 73 with the resolver valve 48.

A chamber 76 is formed at the left end of the pump piston 63 and is connected to the second passage means 56 through third passage means, such as a line 77.

Referring to FIG. 2, in a second embodiment of the present invention, the pressure sensitive shunt valve assembly 47 of FIG. 1 is replaced with a pressure sensitive accumulator 81 having a piston 82 slidably disposed within a housing 83. A variable volume chamber 84 at one end of the piston 82 is connected to the first conduit 34' intermediate a flow controlling means 49' and the first chamber 24 by a passage means 54'. Movement of the piston 82 to the right increases the volume of the variable volume chamber.

A piston means 71' is associated with the piston 82 for moving piston 82 to the right for increasing the volume of the variable volume chamber in response to the rate of pressure rise of the output fluid of the pump 12 exceeding a preselected rate of pressure rise.

The piston means 71' can be, for example, a piston 72' having one end in abutment with the piston 82 and its other end positioned within a chamber 73' which is connected to the resolver valve 48, FIG. 1, through a line 74'.

The flow controlling means 49' of this embodiment preferably can be an orifice 86 positioned within the first conduit 34' and a check valve 87 connected to the first conduit in parallel with the orifice. The orifice 86 is sized for establishing a maximum fluid flow rate through the first conduit in a direction toward the first chamber.

In the operation of the control system of FIG. 1 of the present invention, the resolver valve 48 transmits the higher fluid pressure of conduit 16 or 17 through the line 74 to the chamber 73 where the pressurized fluid acts against the piston 72 urging it to the right. When the pressure of the output fluid of the pump 12 increases, the pump piston 63 is moved to the right pumping fluid from the chamber 66 to the chamber 61. If the rate of pressure rise is below a preselected rate of pressure rise, the flow rate of the fluid from chamber 66 to chamber 61 is below the maximum flow rate of the orifice 59 in the valve member 51 and the orifice passes the fluid from the chamber 66 to chamber 61 to the second passage means 56 where it can flow through the line 77 to the chamber 76 at the back side of the pump piston 63. Thus, valve member 51 remains in the first position and the underspeed actuator 19 is controlled by the pressure differential developed in the conduits 34, 38 by the venturi 32.

However, if the output fluid pressure of pump 12 increases rapidly or above the preselected rate of pressure rise, the pump piston 63 is moved to the right at a faster rate and the flow rate of the fluid being pumped from chamber 66 to chamber 61 exceeds the maximum flow rate of the orifice 59 in the valve member 51. This causes a momentary build-up of fluid pressure in chamber 66 forcing the valve member 51 to the second position. At the second position of the valve member, first chamber 24 is connected with second chamber 26. This quickly reduces the fluid pressure level in the first chamber so that the piston 21 moves towards the first position under the influence of the spring 28 and the fluid pressure in the second chamber to decrease the displacement of the pump 12.

After a short duration, the valve member 51 will be biased to the first position by the spring 58. However, by this time, the higher pressure being generated by pump 12 results in a decrease in the engine speed so that the pressure differential in the first and second conduits 34, 38 is adjusted by the venturi 32 and the underspeed actuator 19 continues to control the displacement of the pump 12 in the usual manner.

In the operation of the second embodiment, shown in FIG. 2, a pressure increase in the output fluid of the pump 12 results in the piston 82 of the accumulator 81 being moved to the right increasing the volume of the variable volume chamber 84. If the pressure increase is below a preselected rate of pressure rise, the flow rate of fluid entering the chamber 84 from the first conduit 34 is below the maximum fluid flow rate of the orifice 86. Thus, fluid passing through orifice 86 enters the chamber 84 and no fluid is drained from the first chamber 24 so that the piston 21 of the underspeed actuator is controlled by the differential pressure in the conduits 34, 38 generated by the venturi 32.

However, if the output fluid pressure of the pump 12 increases rapidly or above the preselected rate of pressure rise, the piston 82 is moved to the right at a faster rate, and the flow rate of the fluid entering the variable volume chamber 84 exceeds the maximum fluid flow rate through the orifice 86. Thus, fluid is transferred from the first chamber 24 to the variable volume chamber 84, thereby decreasing the fluid pressure level in the first chamber so that the piston 21 moves towards its first position to decrease the displacement of the pump 12. Fluid continues to flow through the orifice 86 so that after a short duration, the pressure differential between chambers 24 and 26 is again reestablished. However, by this time, the higher pressure being generated by the pump 12 results in a decrease in the engine speed causing a new pressure differential to be generated by the venturi 32 proportional to the new engine speed and the position of the piston 21 is again controlled in the usual manner.

Other aspects, objects and advantages of this invention can be obtained from a study of the drawings, the disclosure and the appended claims.

The embodiments of the invention in which an exclusive property or privilege is claimed are defined as follows:

1. A control system for controlling the displacement of a first pump driven by a prime mover, comprising:
    control means for controlling the displacement of said first pump;
    an underspeed actuator having a piston, first and second actuating chambers at opposite ends of said piston, and biasing means, said piston being connected to the control means and movable between a first position at which said first pump is at minimum displacement and a second position at which said first pump is at maximum displacement, said biasing means urging the piston toward the first position, and said piston being movable between said first and second positions in response to pressure differential in said first and second chambers;
    signal means for controllably developing first and second control signals in response to the operating speed of the prime mover and delivering said first and second signals to respective first and second chambers; and
    first means for controllably reducing the magnitude of fluid pressure in the first chamber in response to the rate of pressure rise of the output fluid of said first pump exceeding a preselected rate of pressure rise.

2. The control system of claim 1 wherein said first means includes a valve member movable between a first position at which the first chamber is blocked from communication with the second chamber and a second position at which the first chamber is in communication with said second chamber, and second means for moving the valve member to the second position in response to the rate of pressure rise of the output fluid of said first pump exceeding said preselected rate of pressure rise.

3. The control system of claim 2 including a first conduit connecting the first signal to the first chamber and flow controlling means positioned in the first conduit at a location upstream of the first means for limiting fluid flow through the first conduit.

4. The control system of claim 2, wherein the first means includes a housing having a first bore, said valve member being slidably positioned within said first bore, a third chamber at one end of said valve member; and said second means including a linear pump having a second bore, a pump piston slidably positioned within the second bore, a fourth chamber at one end of the pump piston and being in fluid communication with said third chamber, and piston means for moving said pump piston within said second bore and for pumping fluid from the fourth chamber into the third chamber in response to a preselected pressure increase in the output fluid pressure of said first pump.

5. The control system of claim 2 including a first conduit connecting the first signal to the first chamber, a second conduit connecting the second signal to the second chamber, a third chamber at one end of said valve member, first and second passage means connected to the first and second conduits, respectively, said first passage means being in communication with the second passage means at the second position of the valve member and said first passage means being blocked from said second passage means at the first position of said valve member, and an orifice in said valve member communicating the third chamber with said second passage means.

6. The control means of claim 5, wherein the second means includes a pump piston and including a fifth chamber at the other end of the pump piston and third passage means connecting the second passage means with the fifth chamber.

7. The control system of claim 1 including a first conduit connecting the first signal to the first chamber and wherein said first means includes a flow controlling means connected to the first conduit for establishing a maximum fluid flow rate through the first conduit in a direction toward the first chamber, a variable volume chamber connected to the first chamber, and piston means for increasing the volume of the variable volume chamber in response to a preselected pressure increase in the output fluid pressure of said first pump.

8. The control system of claim 7 including a housing, a second piston slidably positioned within the housing, said variable volume chamber being positioned at one end of said second piston, said second piston being movable between a first position at which the volume of the variable volume chamber is at a minimum and a second position at which the volume of the variable volume chamber is at a maximum, passage means connecting the variable volume chamber to the first conduit intermediate the flow controlling means and the first chamber, said piston means being associated with said second piston for moving the second piston to the second position in response to said preselected pressure increase in the output fluid pressure of said first pump.

9. The control system of claim 8 wherein said flow controlling means includes an orifice connected to the first conduit and a check valve connected to the first conduit in parallel to said orifice.

* * * * *